Oct. 3, 1961 J. D. TEAR 3,002,389
FORCE MEASURING APPARATUS
Filed Feb. 19, 1958 2 Sheets-Sheet 1

INVENTOR
JAMES D. TEAR
BY Victor N. Borst
ATTORNEY

Oct. 3, 1961 J. D. TEAR 3,002,389
FORCE MEASURING APPARATUS
Filed Feb. 19, 1958 2 Sheets-Sheet 2

INVENTION
JAMES D. TEAR
BY
ATTORNEY

3,002,389
FORCE MEASURING APPARATUS
James D. Tear, Great Neck, N.Y., assignor to Sperry Rand Corporation, Ford Instrument Company Division, Long Island City, N.Y., a corporation of Delaware
Filed Feb. 19, 1958, Ser. No. 716,241
4 Claims. (Cl. 73—514)

This invention relates to mechanical accelerometers and particularly to accelerometers which serve to yield direct indications of the force of acceleration acting on a body having no fixed axis of travel.

In general, the invention contemplates a device which has a stationary member and a displaceable member. One of the members is provided with a plurality of recesses or guides in which there are disposed elements which, under acceleration forces, act against surfaces of cams mounted in the other member. Preferably the elements are in the form of spherical masses and the recesses are cylindrical guides. It has been found that the component acceleration forces acting on the individual spheres can be resolved along the axis of the cylindrical guides and summed in terms of the total force tending to displace the displaceable member. The latter may for example be a rotor, with the force tending to displace the rotor, a torque acting thereon; it may, therefore, be observed that under proper calibrating conditions the resultant output torque will bear a predictable relation to the acceleration of the body in which the device is carried.

Additionally, it has been found that the location and angular dispostion of the cylindrical guides affects output error. Experiments have demonstrated that when the guides are arranged symmetrically with respect to a fixed point in the device, advantages in terms of economy of construction and minimization of error are gained. It is generally useful for effecting this symmetry to conceive of the guide a carrying member, regardless of its actual shape, as a regular sided polyhedron, such as a tetrahedron, hexahedron, octahedron, dodecahedron, icosahedron, etc. The guides may then be symmetrically arranged with respect to certain critical points of the virtual polyhedron as its vertices, side edge centers, centers of the superficial areas of the sides, or some combination thereof. Then, the axes of the guides may be directed so as to intersect at the center of a virtual sphere circumscribing the figure.

One object of the invention is to provide a mechanical apparatus capable of directly indicating force of acceleration.

Another object of the invention is to provide a mechanical apparatus for directly and accurately indicating force of acceleration within predetermined maximum error limitations.

Other objects and features of the invention may be appreciated on reading the following description of one embodiment thereof taken in conjunction with the accompanying drawings, in which.

Figure 1:
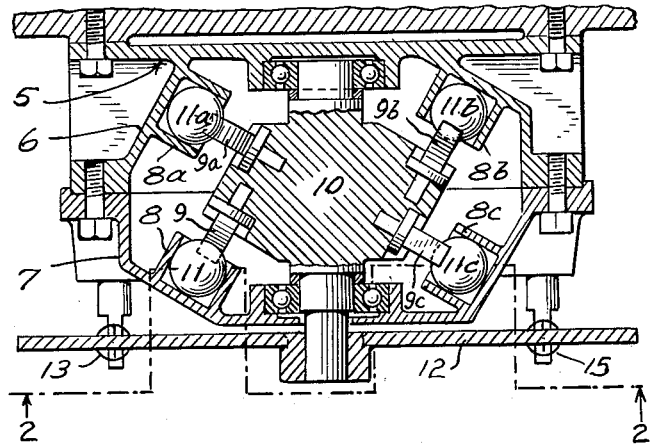
FIG. 1 is a sectional view taken on line 1—1 of FIG. 2 of a force measuring apparatus the elements of which are arranged in accordance with the principles of invention.
Figure 2:
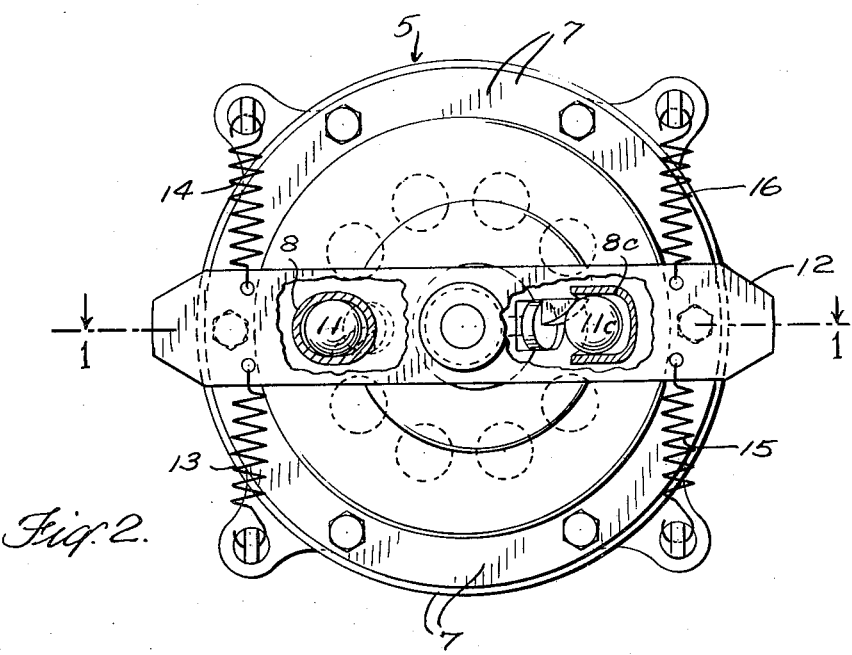
FIG. 2 is a sectional view of same taken on line 2—2 of FIG. 1.
Figure 3:
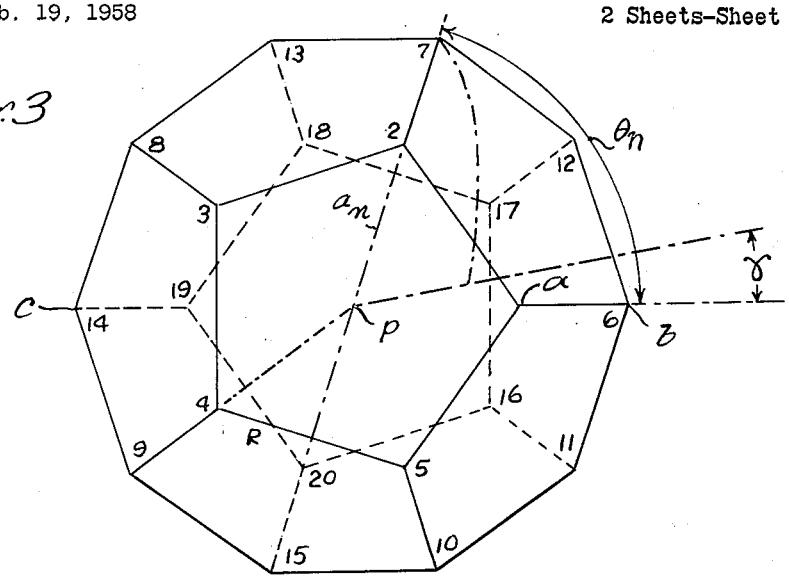
FIG. 3 is a plane view of a geometric figure employed to determine the placement of the operative elements in the device.

As shown in FIG. 1 one embodiment of the invention includes a stationary member 5 having frames 6 and 7 which are bolted together to comprise a unitary structure. The frames 6 and 7 support cylindrical ball guides 8, $8^a$, $8^b$, etc. Spherical masses or balls 11, $11^a$, $11^b$, etc. are respectively disposed in the ball guides 8, $8^a$, $8^b$, etc.

A rotor member 10 is provided within the stationary frames 6 and 7 and supports cams 9, $9^a$, $9^b$, etc. in normal face engagement with the balls 11, $11^a$, $11^b$, etc., respectively. The cams are arranged on each side of the rotor axis so as to impart a unidirectional torque on the rotor member regardless of the direction of the applied force due to acceleration.

A torque indicator 12 in the form of a lever arm is mounted on the rotor member and by virtue of its connection by springs 13, 14, 15 and 16 to the frame 7 provides a balanced system for indicating the torque on the rotor member as measured by displacement of the lever arm. Obviously, a torque device may be mounted on the rotor shaft which need not displace to yield accurate measurements of the total accelerating force.

Figure 4:
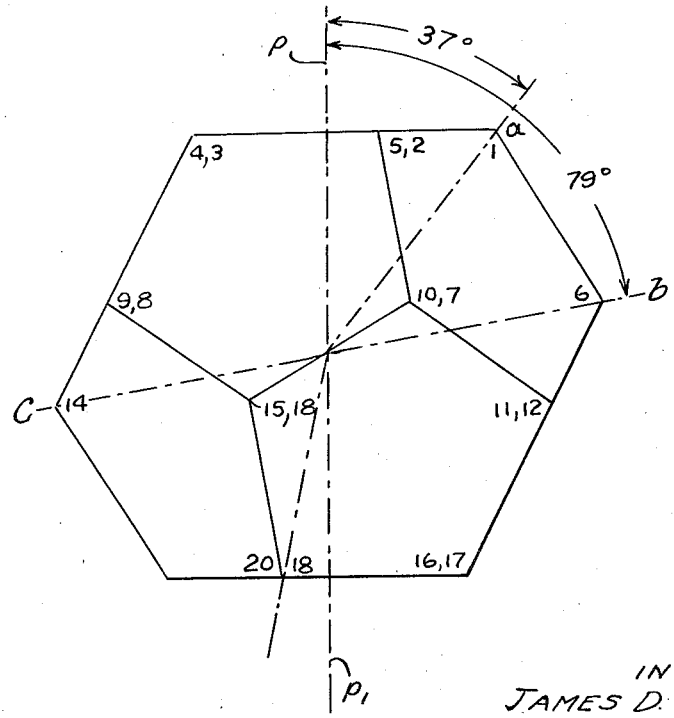
FIG. 4 is a front view of the figure shown in FIG. 3.

The ball guides and cams are actually arranged in accordance with selected critical points of a dodecahedron. The selected points are the vertices, there being twenty vertices provided by this particular geometric figure. It should be understood that the actual rotor conformation need not be controlled by the geometry of the polyhedron which is used to determine the location and angular disposition of the cams and ball guides. For example, while the shape of the rotor members shown in section in FIG. 1 is not dodecahedronal, the ball guides 8, $8^a$, $8^b$, etc. are angularly disposed and located according to the radii to the vertices $a$, $b$ and $c$ and the accurate distances to the same vertices from an assumed rotor axis in the plane of a sphere circumscribing an assumed decahedron. The points or vertices $a$, $b$ and $c$ in the plane of the dodecahedron are shown in FIG. 4 to be approximately 37°, 79° and 259° with respect to the rotor axis $p$—$p'$ and the corresponding ball guides 8, $8^a$, $8^b$ etc. shown in FIG. 1 have the same angle measurements with respect to their rotor axis and are axially disposed in accordance with the spherical radii drawn to the vertices and shown in dotted lines in FIG. 4. The rotor and stationary members are then provided with cams and ball guides disposed according to each of the other vertices of the dodecahedron and the radii from the other vertices to the center of its circumscribed sphere. In lieu of or in combination with the vertices, centers of the sides or edge centers may be taken as the critical points for locating and disposing the ball guides and cams. Other regular sided polyhedrons may be assumed as a ball and cam locating construction guide without sacrificing the symmetry and balance which is thought to lead to the best results. For simplicity of construction and demonstrated accuracy the dodecahedron is preferred for determining the disposition of the operative elements in the rotor and stationary members.

For a dodecahedron using 20 ball guides at the vertices and 32 ball guides (20 ball guides at the vertices and 12 ball guides at the centers of the faces) Table 1 discloses the maximum error at any one of the critical points if the calculated or true component accelerating force at each of the critical points is considered to be unity. The calculations are based on known cosine formulae for solving the sides of oblique spherical triangles in which the sides include vectorial representations of the accelerating force and the unknown component forces at the vertices of the circumscribed dodecahedron.

TABLE 1

*Acceleration test results using a circumscribed sphere of dodecahedron*

|  | Pole | Azimuth | | |
| --- | --- | --- | --- | --- |
|  |  | 0° | 36° | 36° |
|  |  | Latitude | | |
|  | 37°23' | 22°41' | 31°43' |  |
| 20 ball guides @ vertices | .98 | 1.05 | .99 | .98 |
| Error | −.02 | +.05 | −.01 | −.02 |
| 32 ball guides @ vertices | 1.03 | 1.03 | 1.00 | .96 |
| Error | +.03 | +.03 | 0 | −.04 |

Additional ball guides are not deemed to produce an accelerometer of sufficiently improved accuracy to merit the additional expense and complexity of construction.

It is understood that various modifications in construction may be effected by persons skilled in the art without departing from the principle and scope of invention as defined in the appended claims.

What is claimed is:

1. A force measuring apparatus comprising a rotor member and a stationary member, a plurality of ball guides disposed in one of said members and a spherical element supported within each ball guide, said ball guides being distributed in said one member according to the vertices of a regular sided and symmetrical polyhedron there being a ball guide at each virtual vertex thereof, a plurality of cams supported by the other of said members, each of said cams being normally in face to surface contact with one of said spherical elements, said cams being disposed with respect to said elements so as to be adapted to impart unidirectional torque to said rotor, and torque indicating means mounted on said rotor member and resiliently connected to said stationary member.

2. A force measuring apparatus as claimed in claim 1 wherein, assuming a hypothetical sphere is in circumscribing relation to said polyhedron, said ball guides having guide means oriented toward the center of said hypothetical sphere.

3. A force measuring apparatus as claimed in claim 2 wherein the symmetrical polyhedron virtually employed to control the distribution and location of the elements is a dodecahedron.

4. A force measuring apparatus as claimed in claim 3 wherein the spherical elements are supported by the stationary member and the cams are supported by the rotor member.

References Cited in the file of this patent

UNITED STATES PATENTS

| 1,554,896 | Tacchi | Sept. 22, 1925 |
| 2,695,165 | Hanson | Nov. 23, 1954 |
| 2,832,581 | Youngs | Apr. 29, 1958 |

FOREIGN PATENTS

| 932,243 | France | Nov. 17, 1947 |